United States Patent
Pyrhonen et al.

(10) Patent No.: US 10,060,363 B2
(45) Date of Patent: Aug. 28, 2018

(54) THERMAL POWER MEASUREMENT

(71) Applicant: Lappeenranta University of Technology, Lappeenranta (FI)

(72) Inventors: Juha Jaakko Pyrhonen, Lappeenranta (FI); Raimo Juntunen, Lappeenranta (FI); Tatu Musikka, Lappeenranta (FI); Olli Pyrhonen, Lappeenranta (FI); Andrey Mityakov, Lappeenranta (FI); Sergey Z. Sapozhnikov, Lappeenranta (FI); Vladimir Y. Mityakov, Lappeenranta (FI)

(73) Assignee: Lappeenranta University of Technology, Lappeenranta (FI)

( * ) Notice: Subject to any disclaimer, the term of this patent is extended or adjusted under 35 U.S.C. 154(b) by 0 days.

(21) Appl. No.: 15/316,216

(22) PCT Filed: Jun. 4, 2015

(86) PCT No.: PCT/EP2015/062503
§ 371 (c)(1),
(2) Date: Dec. 5, 2016

(87) PCT Pub. No.: WO2015/185690
PCT Pub. Date: Dec. 10, 2015

(65) Prior Publication Data
US 2017/0152797 A1 Jun. 1, 2017

(30) Foreign Application Priority Data

Jun. 5, 2014 (GB) .................................. 1410001.0

(51) Int. Cl.
*F02D 41/26* (2006.01)
*F02D 35/02* (2006.01)
(Continued)

(52) U.S. Cl.
CPC ......... *F02D 35/02* (2013.01); *F02D 13/0215* (2013.01); *F02D 41/0002* (2013.01);
(Continued)

(58) Field of Classification Search
CPC .... F02D 35/02; F02D 35/025; F02D 13/0215; F02D 41/3005; F02D 41/26; F02D 41/0002; F02D 2200/021; G01M 15/048
(Continued)

(56) References Cited

U.S. PATENT DOCUMENTS 5,941,213 A 8/1999 Ishii et al.

FOREIGN PATENT DOCUMENTS

DE 10 2008 042888 A1 4/2010

OTHER PUBLICATIONS

Sergey Z Sapozhnikov et al: "Gradient-type sensors for heat flux measurements at high temperatures", Dec. 24, 2007, techical physics letters, 2008, vol. 34, No. 10, pp. 815-817. Pleiades publishing, Ltd., 2008.*
(Continued)

*Primary Examiner* — Hai Huynh
(74) *Attorney, Agent, or Firm* — Renner, Otto, Boisselle & Sklar, LLP

(57) ABSTRACT

There can be provided an engine control apparatus having a controller operable to receive input from a heat flux sensor arranged to measure combustion power within an internal combustion engine and to use said input in a control process to determine an adjustment to a controllable engine operation parameter.

19 Claims, 3 Drawing Sheets

(51) Int. Cl.
F02D 41/00 (2006.01)
F02D 41/30 (2006.01)
F02D 13/02 (2006.01)

(52) U.S. Cl.
CPC ......... *F02D 41/26* (2013.01); *F02D 41/3005* (2013.01); *F02D 2200/021* (2013.01)

(58) Field of Classification Search
USPC ............. 123/435; 701/111; 73/35.07, 114.09
See application file for complete search history.

(56) References Cited

OTHER PUBLICATIONS

International Search Report and Written Opinion for corresponding Patent Application No. PCT/EP2015/062503 dated Sep. 14, 2015.
International Preliminary Report on Patentability for corresponding Patent Application No. PCT/EP2015/062503 dated Sep. 5, 2016.
Sumin, Mikhail, "Heat Flux Measurement Inside Internal Combustion Engine With Gradient Heat Flux Sensor", Lappeenranta University of Technology, XP002741930, Jun. 4, 2013, pp. 1-79.
Lejsek, D. et al., "Investigations on the Transient Wall Heat Transfer at Start-Up for SI Engines with Gasoline Direct Injection", SAE Technical Papers, No. 2009-01-0613, XP002741931, Apr. 20, 2009, pp. 382-388.

\* cited by examiner

THERMAL POWER MEASUREMENT

This application is a national phase of International Application No. PCT/EP2015/062503 filed Jun. 4, 2015 and published in the English language, which claims priority to United Kingdom Patent Application No. 1410001.0 filed Jun. 5, 2014, which are hereby incorporated herein by reference in their entirety.

FIELD AND BACKGROUND

The present disclosure relates to thermal power measurement and in particular but not exclusively to thermal power measurement for control of internal combustion engines.

Internal combustion engines are heat engines that perform the conversion of heat to mechanical energy. Internal combustion engines are very commonly used to provide mechanical energy: it is believed that there at least 1 billion internal combustion engines in the world. A large variety of internal combustion engine types exist, these types can include piston-type engines such as those used to provide mechanical energy to propel automobiles such as cars, trucks, motorcycles, busses, light aircraft, lawnmowers and the like. Other types internal combustion engine include types that do not have pistons, such as turbines and jet engines. Internal combustion engines can produce power in the range of a few watts to hundreds of megawatts.

In an internal combustion engine, a prepared fuel combusts with an oxidiser (often air but other sources of oxygen can be used) with the result that chemical energy stored in the fuel is transferred to the movement of an engine output (typically causing rotation of some form of drive shaft). Piston-based internal combustion engines can be produced that operate according to one of a number of different operational cycles. Among the most well-known reciprocating piston type internal combustion engine cycles are the Otto, Diesel, Brayton, Atkinson and Miller cycles. Rotary "piston" internal combustion engines can also exist and the among most well-known types is the Wankel engine (which follows approximately the Otto cycle). Turbines and jet engines (which can include turbofans, turbojets and rocket engines) are typically continuous rather than cyclical in operation.

Internal combustion engines can operate using a variety of different fuels. Examples include: petroleum oil, autogas, petrol, diesel, methane, kerosene, coal, biodiesel and hydrogen.

The performance of an internal combustion engine varies based upon factors such as energy efficiency, power to weight ratio, torque curve etc. With respect to energy efficiency, this affects the rate of recovery of usable energy from the combustion product's thermal energy. The energy can be transformed into work by utilising the increase in temperature and pressure created during combustion. The theoretical efficiency can be calculated by using an idealised thermodynamic cycle, for example, the Carnot cycle. In the Carnot cycle the efficiency depends only from high and low operating temperatures of the engine. At the present time, the maximal thermodynamic limit of efficiency for a typical internal combustion engine is understood to be about 40% for commercial Diesel engines, although laboratory tests are believed to have reached up to 49% efficiency (noting also that Otto cycle engines typically achieve thermodynamic lower efficiency than combined (Seiliger, or Trinkler, or Sabathe) cycle engines). The actual efficiency of a real internal combustion engine would be expected to be lower than such a theoretical maximum due to the impact of the real engine not benefiting from the idealised assumptions in the calculation.

Internal combustion engines produce as by-products of the combustion process air pollution emissions. These pollutants typically include $CO$, $CO_2$, $NO_x$ and others. The level of pollutants produced by a given internal combustion engine will vary depending upon the fuel and combustion approach used, but also from operating parameters of the engine operating relating to the combustion process. Such operating parameters can include fuel/air ratio, operating temperature, fuel quality, etc. The typical control approach for an internal combustion engine is to monitor inputs and outputs and to vary the inputs in an effort to optimise the outputs.

SUMMARY

The present teachings have been developed in the light of drawbacks of known systems.

Viewed from one perspective, the present teachings can provide an approach for monitoring the thermal energy produced by combustion within an internal combustion engine. Further, the present teachings can provide an approach for control of an internal combustion engine based upon the monitoring of the thermal energy produced by combustion.

Viewed from a first aspect, the present teachings can provide an engine control apparatus, comprising: a controller operable to receive input from a heterogeneous gradient heat flux sensor arranged to measure combustion power within an internal combustion engine and to use said input in a control process to determine an adjustment to a controllable engine operation parameter, further comprising the heterogeneous gradient heat flux sensor, the heterogeneous gradient heat flux sensor being arranged in direct thermal communication with a combustion chamber of the engine. By performing a direct measurement of the combustion process in this way, an engine can be controlled to provide optimised efficiency and performance.

Viewed from another aspect, the present teachings can provide a combustion system comprising: an internal combustion engine having a combustion chamber; a heterogeneous gradient heat flux sensor arranged in direct thermal communication with the combustion chamber; and an engine controller arranged to receive a signal from the heterogeneous gradient heat flux sensor and to control a controllable engine operation parameter in dependence upon said signal. Thus a combustion system can be provided that is able to operate based upon direct measurement of the combustion process occurring in the engine.

Viewed from a further aspect, the present teachings can provide a sensor kit for installation to an internal combustion engine, the kit comprising: at least one heterogeneous gradient heat flux sensor installable to be in direct thermal communication with a combustion chamber of an internal combustion engine and operable to output a signal representative of a heat flux at the sensor during a combustion cycle of the internal combustion engine, and a signal conveyor connectable to convey an output signal from the heat flux sensor to an engine management system for an engine into which the heat flux sensor is to be installed. Thereby an existing engine can be retrofitted to facilitate controllability on the basis of direct measurements of the combustion process occurring in the engine.

Viewed from another aspect, the present teachings can provide a method of controlling an internal combustion engine, the method comprising: receiving a signal from a heterogeneous gradient heat flux sensor of a combustion chamber of the internal combustion engine, wherein the heterogeneous gradient heat flux sensor is arranged in direct thermal communication with a combustion chamber of the engine; and using the signal as an input to a feedback control loop for controlling one or more controllable engine operation parameters of the internal combustion engine. Thus an engine control approach can be adopted based upon signals collected from the combustion chamber and thus directly representative of the ongoing combustion process.

BRIEF DESCRIPTION OF THE DRAWINGS

Detailed examples in accordance with the present disclosure will now be described with reference to the accompanying figures, in which.

Figure 1:
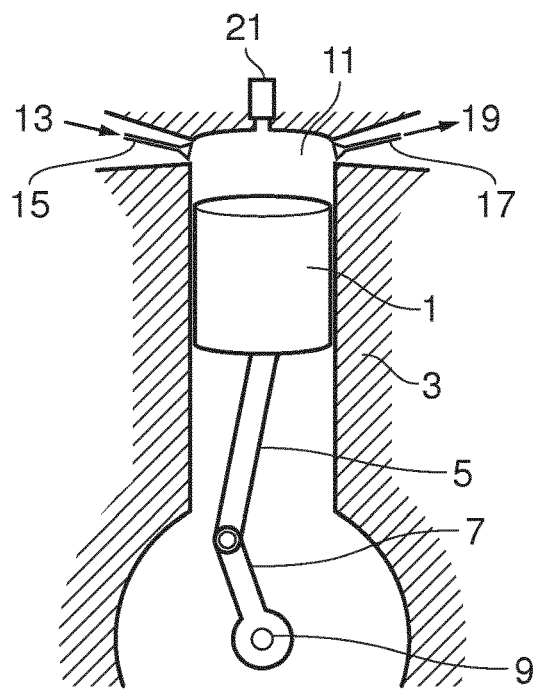
FIG. 1 illustrates a cyclic operation internal combustion engine.

While the present teachings are is susceptible to various modifications and alternative forms, specific embodiments are shown by way of example in the drawings and are herein described in detail. It should be understood however that drawings and detailed description attached hereto are not intended to limit the scope of the claims to the particular form disclosed but rather the claims are to cover all modifications, equivalents and alternatives falling within the definitions as set out the claims as properly interpreted according to the prevailing law.

DETAILED DESCRIPTION

Examples in accordance with the present teachings are now described to illustrate the use of heat flux sensors to enable a thermal energy management-based approach to engine management for a variety of internal combustion engine types.

A first type of internal combustion engine is illustrated in FIG. 1. As show in figure a cyclic operation internal combustion engine with reciprocal piston operation can be utilised. FIG. 1 shows schematically a single cylinder of an engine.

In the cylinder of FIG. 1, a reciprocally movable piston 1 is housed in a cylinder bore 3 of a cylinder casing and the piston 1 can move along an axis of the cylinder bore 3. The piston 1 is connected via crank arm 5 to a crank 7 which in turn is connected to a driveshaft 9. Movement of the piston 1 within the cylinder bore 3 towards the driveshaft 9 causes rotation of the drive shaft through the connection to the crank arm 5 and crankshaft 7. Continued rotation of the driveshaft due to inertia and/or action of further cylinders also providing drive to the same drive shaft causes the piston 1 to move along the cylinder bore 3 in a direction away from the driveshaft 9.

To cause movement of the piston 1 toward the driveshaft 9, combustion is carried out at the side of the piston 1 distal the driveshaft 9. To this end, a combustion chamber 11 is defined at the so-called "head" end of the cylinder. To feed combustible material to the combustion chamber and inlet 13 is provided through which fuel and oxidant can be provided, the flow of combustible material being controlled by a valve 13. Following combustion of the fuel and oxidant in the combustion chamber 11 the increased pressure caused by the combustion pushes the piston 1 along the cylinder bore 3 and the combustion products are allowed to exit the combustion chamber via valve 17 to outlet 19. In the present example, combustion is caused by a spark plug 21 which acts as an ignition source for the fuel and oxidant.

As will be appreciated, the operation and components of the engine can vary according to the configuration employed. For example, the timing of combustion, piston movement and opening of inlet/outlet valves will vary in accordance with whether the engine operates on a two-stroke or a four-stroke cycle. The number of valves can vary, providing for multiple inlet and/or outlet vales. If multiple inlet valves, it is possible to divide fuel and oxidant supply between different valves, or to have less than all inlet valves supplying only oxidant and the remaining valves supplying oxidant and fuel. If the engine operates on diesel fuel, then there may be no specific ignition source element as such engines use compression to trigger combustion.

As will be appreciated, a number of parameters of such an engine can be modified during operation to modify the performance characteristics thereof. Examples of such parameters include: fuel/oxidant ratio, timing of valve operation (usually expressed relative to crankshaft rotation angle), ignition timing (usually expressed relative to crankshaft rotation angle), inlet gas pressure of fuel/oxidant mix, and cooling amount provided to the engine. All of these parameters can affect one or more performance characteristics such as power generated, torque generated and fuel consumption rate. Detection of engine operation conditions can be used to feed a control approach for adjusting the operation parameters. Such a control system can also make use of data describing known operational results of certain operation parameters. Examples can include predetermined knowledge of the impact of timing adjustments of the valves and/or ignition source.

Figure 2:
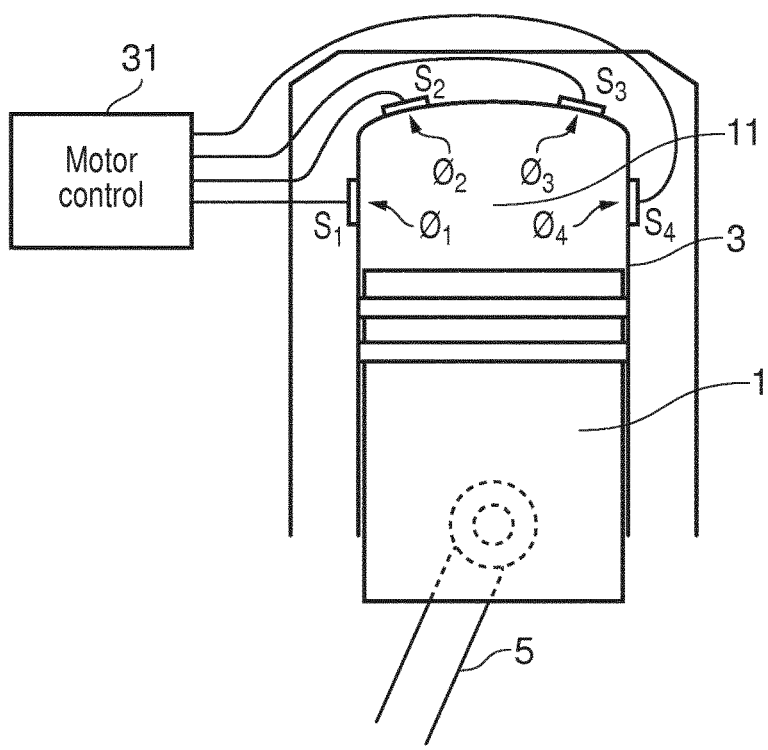
FIG. 2 illustrates a sensor arrangement for a cyclic operation internal combustion engine.

In the present disclosure one input to such a control approach is a direct measure of combustion energy within the combustion chamber. FIG. 2 illustrates a combustion chamber provided with sensors for detection of combustion energy for use in such a control technique.

The sensors used in the present example are heat flux sensors having a response time in nanoseconds and can operate in the temperature and pressure conditions that are expected in the combustion chamber of an internal combustion engine. The output of such a sensor can be provided to an engine control unit for use as a feedback input for a control process. The output levels of one example sensor are of the order of millivolts, although sensors outputting at levels not directly usable by an engine control unit can be utilised by providing signal level amplification or attenuation if required.

One example of a heat flux sensor that can provide response time and environmental capabilities suitable for use in an arrangement consistent with the present teachings is described in the paper Sapozhnikov, S. Z. et al. "High-temperature heat transfer investigations using heterogeneous gradient sensors" Proceedings of the 14th International Heat Transfer Conference (IHTC14) Aug. 8-13, 2010, Washington, D.C., USA. Such sensors output an electrical signal responsive to the heat rate applied to the surface of the sensor.

Heat flux sensors of this type may be known as heterogeneous gradient heat flux sensors (HGHFS). Gradient heat flux sensors (GHFS) of all types realize the transverse Seebeck's effect in their action. A GHFS is usually a plate of anisotropic media, when heat and electric conductivity and thermoelectric power coefficient are different in two dimensions. The vector of heat flux q is normal to the vector of thermoelectric field intensity E; therefore, the transverse Seebeck's effect is realized. A HGHFS is produced from metal-metal or metal-semiconductor layers, with the layers being inclined to the operating surfaces of GHFS at an angle. The exact properties of any given HGHFS are determined by a combination of the angle of inclination of the layers in the structure, the thicknesses of the layers, the thermal conductivities of the layers, the electric resistivities of the layers and the thermoelectric power coefficients of the layers. Example materials combinations for a HGHFS include stainless steel and nickel, ARMCO™ iron and constantan, Chromel™ and Alumel™, titanium and molybdenum, silicon and aluminium, and n-doped silicon and p-doped silicon.

As is illustrated in FIG. 2, a combustion chamber 11 can be provided with one or more sensors. In the example of FIG. 2, four sensors $S_1$, $S_2$, $S_3$, $S_4$ are provided. In other examples, the number of sensors may be greater or lower than 4. For example, some applications may utilise one, two or three sensors, whereas other applications may utilise 5, 6, 7, 8 or even more sensors. As will be appreciated, an increased number of sensors provides more information about thermal conditions within the combustion chamber while at the same time increasing the data processing requirements for making use of the information from the sensors.

Each sensor measures a corresponding heat flux flowing therethrough. Thus in the Example of FIG. 2 which utilises sensors $S_1$ to $S_4$, direct measurements of the heat fluxes $\phi_1$ to $\phi_4$ can be taken from the cylinder.

For simplicity, FIG. 2 does not illustrate valves, inlets, outlets or ignition sources. It will be appreciated that these elements will be provided as necessary for the operation of the engine and the sensors will be located so as not to obstruct operation of the those elements. As will be appreciated, the flow of heat currents within a given combustion chamber would be expected to vary relative to the flow of heat currents within another given combustion chamber in dependence upon the design of the combustion chamber in terms of geometry and/or materials. Thus, although a heat flux sensor may in theory be positioned at any available space in the interior surface of the combustion chamber, it may be found for a given implementation that different sensor locations may give rise to a more or less sensitive response by the sensor to the thermal behaviour of the combustion chamber. However, it will also be appreciated that as long as the sensor(s) actually deployed and any control system (such as engine control unit 31 illustrated in FIG. 2) that uses the output of that sensor(s) are calibrated to one another then a consistent and therefore expectedly useful output would be achieved.

The installation of the sensors to the combustion chamber is made in accordance with the requirements of the selected sensor. The actual sensing surface of the sensor may be exposed to the interior of the combustion chamber, if the sensor has thermal properties to enable direct exposure to combustion reactions and temperatures. Alternatively, a protective or smoothing layer may be utilised between the sensing surface and the interior of the combustion chamber. Such a layer may provide protection to the sensor surface and/or may provide for avoidance of an uneven surface in the combustion chamber inner surface at the location of the sensor. If a layer is provided over the sensing surface, it is understood that this will affect the heat flux sensed by the sensor. However as long as the impact of the sensor upon the heat flux that reaches the sensor is known or can be modelled in any control arrangements, then the effect of such a layer can be taken account of when performing analysis or calculation based upon the sensor output. In general, the electrical wiring connecting the sensor to a control system would not be exposed to the interior of the combustion chamber as providing wiring capable of withstanding combustion reactions and temperatures would be expected to be expensive while providing no benefit to the operation of the sensor.

As is further illustrated in FIG. 2, the sensors are connected to an engine control unit 31. The sensors in the combustion chamber give an output signal in the form of a voltage signal proportional to the heat flux flowing through the sensors. The engine control unit 31 can thereby receive a signal representative of the thermal power of the combustion for each combustion cycle. Where a multiple cylinder engine is employed, sensors can be used for one, some or all of the cylinders. The engine control unit 31 can then calculate the combustion thermal power and temperature using the measured heat flux signals and adjust the control of the engine according to the measurement.

In the present example, the thermal energy values obtained from the sensors or derived from the sensor signals can be used as an input to a feedback control loop of the engine management unit so as to provide a control input directly representative of the thermal energy generated in the combustion chamber of the engine. Thereby engine performance can be managed by controlling operation parameters of the engine.

Although a single combustion chamber of a piston-type cyclical operation internal combustion engine has been illustrated, it will be appreciated that for a multiple cylinder engine it is possible to provide heat flux sensors in one or more of the cylinders of the engine. It will be appreciated that applying sensors to multiple or all cylinders of an engine will provide more information about thermal conditions within the engine while at the same time increasing the data processing requirements for making use of the information from the sensors.

It is anticipated that this approach has applicability to control of an engine during periods of varying conditions, such as power transients, changing quality of the fuel, changing air temperature and humidity, etc. Since changes in combustion power are reflected directly in the thermal energy measurement, the engine control system can also react rapidly to situations such as incomplete combustion.

Having a direct measurement of thermal combustion power on a cycle-by-cycle basis potentially provides for rapid response adjustments to the engine operation parameters to enable increased engine efficiency and/or reduce emissions. In addition, developed power and torque can be increased or reduced according to present demands being placed upon the engine.

Thus there has now been described an approach to engine management for an internal combustion engine such as a piston-based cyclic operation internal combustion engine that utilises heat flux sensors in a combustion chamber of the cylinder to provide a heat flux measurement value to a control system for the engine. Such an engine control system can use this heat flux measurement value to perform control of engine parameters to manage the engine performance based upon the thermal power generated by the combustion cycle.

Although it has been described in the above example that the heat flux sensors are HGHFS type heat flux sensors, other heat sensors can be used as long as the response time is high enough to provide a meaningful input to the engine management system. Typically this would correspond to providing one reading per cylinder combustion cycle at all expected engine speeds. However in some examples the response rate could provide one reading per N cylinder combustion cycles. To achieve this, filtering could be applied before or in the engine control unit to provide a sampling rate of the output from the heat flux sensor appropriately related to the current engine speed.

A further example of implementing heat flux sensors for an internal combustion engine will now be made with reference to FIGS. 3 and 4, in which the present teachings are applied to a continuous combustion type internal combustion engine such as a gas turbine engine.

Figure 3:
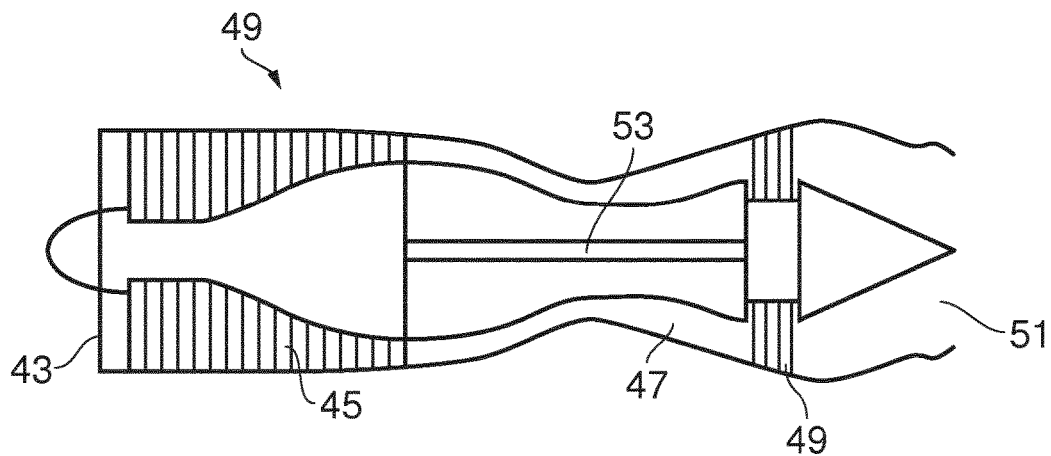
FIG. 3 illustrates a continuous operation internal combustion engine.

FIG. 3 schematically illustrates a gas turbine engine in the form of a turbojet engine 41. The engine has an air inlet 43 through which air is admitted to the engine and from which the air passes to a compressor turbine 45. Compressed air from the compressor turbine 45 then passes to one or more combustion chambers (also known as combustors) 47. In the combustions chambers 47 the compressed air is mixed with fuel and ignited. The rapid expansion caused by the combustion causes the combustion exhaust gases to pass rapidly out of the combustion chamber 47 through a turbine 49 to an exhaust outlet 51. The passage of the combustion exhaust gases through the turbine 49 causes the turbine to rotate which in turn drives a shaft 53 to provide the rotation drive for the compressor turbine 45. The principles of operation of a gas turbine engine apply also to other engine structures such as turbofan engines, turboprop engines, turboshaft engines, propfan engines and indeed also (albeit without the compressor and turbine elements) to ramjet and scramjet engines. All such continuous combustion type internal combustion engines have a combustion chamber in which a compressed oxidant source (usually air although stored oxidant such as liquid oxygen as is used for rocket engines) is mixed with fuel and ignited to cause combustion and provide a flow of heated and expanded exhaust gases from the engine.

Figure 4:
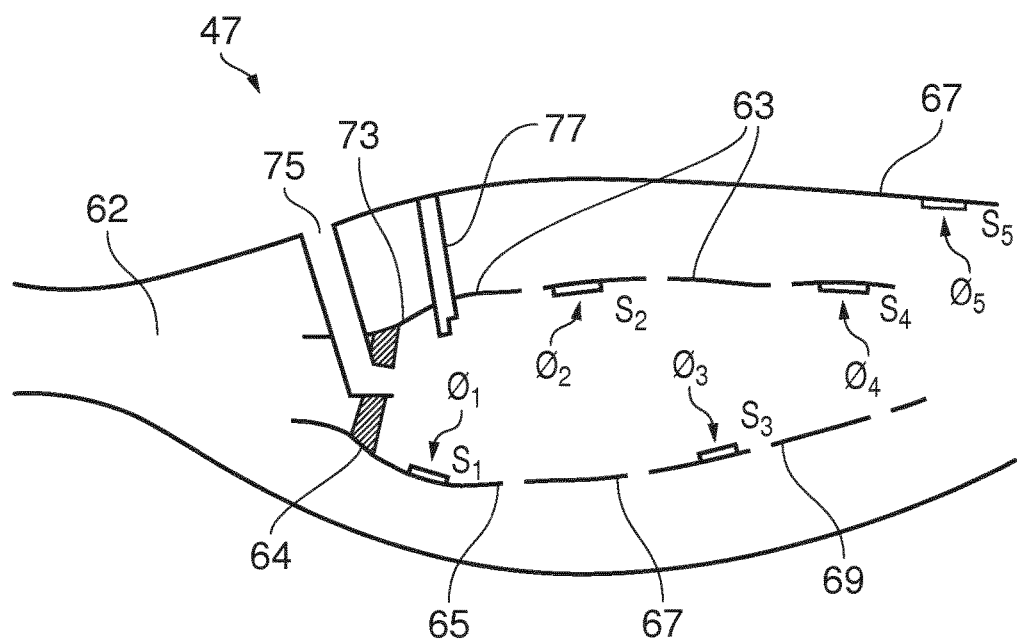
FIG. 4 illustrates a sensor arrangement for a continuous operation internal combustion engine.

FIG. 4 schematically illustrates a combustion chamber 47 into which heat flux sensors can be installed consistent with the present teachings. The combustion chamber 47 includes a case 61 within which the combustion occurs. The inlet of compressed air to the case 61 occurs at a diffuser 62 which slows the low of compressed air to a speed optimal for combustion. A liner 63 is located within the case 61 and typically contains the combustion process. The inlet end 64 of the liner 63 admits air into the liner 63 for the combustion process. The liner has a number of holes 65, 67, 69 to enable air admitted to the case 61 that did not immediately enter the liner at the inlet end 64 to mix with the combustion products before the combustion exhaust exits the combustion chamber and passes to the turbine 49. Control of the relative proportion of the incoming compressed air that passes through the inlet end 64 and holes 65, 67, 69 can affect the performance of the engine and may typically be achieved by the geometry of the case, liner and holes.

To aid combustion, the inlet end 64 of the liner 63 may have a swirler and/or dome 73 to generate turbulence within the air flow entering the liner 63. Combustion is caused by fuel provided into the liner 63 through a fuel injector 75 mixing with the turbulent air in the liner 63 and being ignited by an ignition 77. As will be appreciated, in a continuous combustion type engine, the ignition may typically be used each time the engine is started but the continuous flow of new oxidant and fuel into the combustion chamber to replace exiting combustion exhaust gases means that the combustion would be expected to be self-sustaining such that ongoing provision of ignition would not usually be provided.

As illustrated in FIG. 4, consistent with the approach of the present teachings, one or more sensors may be deployed within the combustion chamber to obtain heat flux measurements relating to the conduct of the combustion. As illustrated, the sensors can be located in a variety of locations in the combustion chamber. In this example, sensors $S_1$ to $S_4$ are located at different positions of the liner 63 and a further sensor $S_5$ is located at the case 61. The sensors $S_1$ to $S5$ therefore provide direct measurements of the heat fluxes $\phi_1$ to $\phi_5$ within the combustion chamber.

The sensors used in the present example are heat flux sensors having a response time in nanoseconds and can operate in the temperature and pressure conditions that are expected in the combustion chamber of an internal combustion engine. The output of such a sensor can be provided to an engine control unit for use as a feedback input for a control process. The output levels of one example sensor are of the order of millivolts, although sensors outputting at levels not directly usable by an engine control unit can be utilised by providing signal level amplification or attenuation if required. The sensors can be HGHFS type sensors.

As with the cyclical engine discussed above, a differing number of sensors and different sensor locations can be used for different implementations.

Although a single combustion chamber of a gas turbine type continuous operation internal combustion engine has been illustrated, it will be appreciated that for an engine having multiple combustion chambers or a distributed combustion chamber it is possible to provide heat flux sensors in one or more of the combustion chambers of the engine. It will be appreciated that applying sensors to multiple or all combustion chambers of an engine will provide more information about thermal conditions within the engine while at the same time increasing the data processing requirements for making use of the information from the sensors.

Furthermore, in a gas turbine type engine with a turbine provided downstream of the combustion chamber(s) it is alternatively or additionally possible to provide heat flux sensors in the blades of the turbine. Such an arrangement would provide for one set of sensors to provide information about combustion conditions in the engine generally, rather than being specific to one combustion chamber (which might reduce the number of sensors required) while the heat flux measurements would be a less direct representation of combustion conditions within each combustion chamber due to the cooling that typically occurs within a gas turbine engine between the combustion location within the combustion chamber and the turbine blades. IN some applications however such sensor output may be sufficiently useful for engine control to be used instead of or in addition to sensor data from sensor(s) within the combustion chamber.

In the present example, the thermal energy values obtained from the sensors or derived from the sensor signals can be used as an input to a feedback control loop of an engine management unit so as to provide a control input directly representative of the thermal energy generated in the combustion chamber of the engine. Thereby engine performance can be managed by controlling operation parameters of the engine.

It is anticipated that this approach has applicability to control of an engine during periods of varying conditions, such as power transients, changing quality of the fuel, changing air temperature and humidity, etc. Since changes in combustion power are reflected directly in the thermal energy measurement, an engine control system can also react rapidly to situations such as incomplete combustion.

Having a direct measurement of thermal combustion power on an ongoing basis potentially provides for rapid response adjustments to the engine operation parameters to enable increased engine efficiency and/or reduce emissions. In addition, developed power and torque can be increased or reduced according to present demands being placed upon the engine.

Thus there has now been described an approach to engine management for an internal combustion engine such as a continuous operation internal combustion engine that utilises heat flux sensors in a combustion chamber of engine to provide a heat flux measurement value to a control system for the engine. Such an engine control system can use this heat flux measurement value to perform control of engine parameters to manage the engine performance based upon the thermal power generated by the combustion cycle.

An illustrative outline of an approach for using the output of one or more heat flux sensors deployed at a combustion chamber of an internal combustion chamber in a manner consistent with the present teachings will now be described with reference to FIG. 5.

Figure 5:
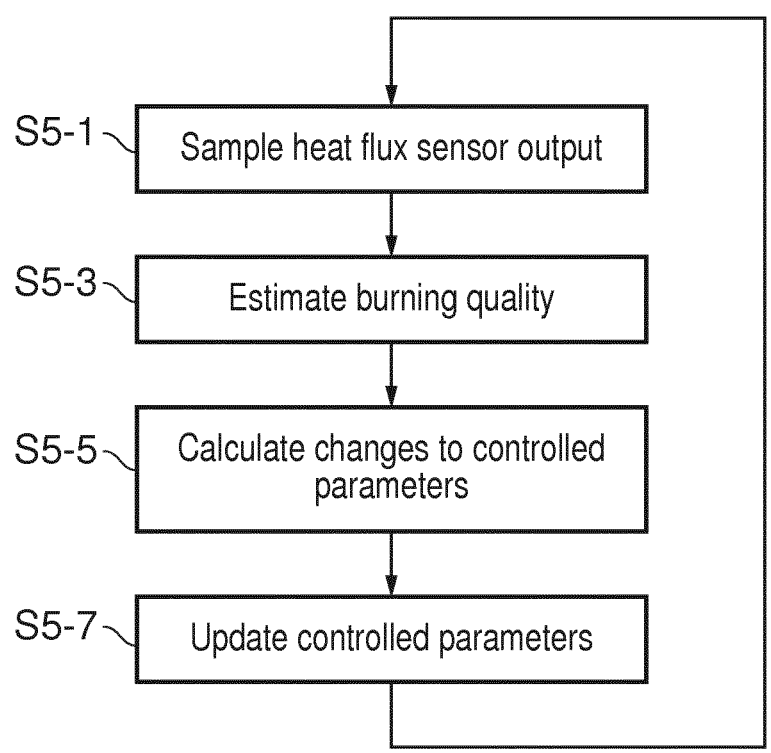
FIG. 5 illustrates a control method.

As illustrated in FIG. 5, it is assumed that the control approach using the output of the one or more heat flux sensors is a control loop process. In this example the loop includes only the inputs from the heat flux sensors, although in other examples the loop may include inputs from other sources, such as throttle input, engine mode input, inlet sensors, outlet sensors or the like.

Each loop of the control process starts at step S5-1 where current readings from the heat flux sensor(s) are taken. Next, at step S5-3, a calculation is made based upon the heat flux values to estimate the burning quality of the combustion. The burning quality estimate may be an estimate of fuel burning rate, an estimate of completeness of combustion, a thermal power value or the like. The estimate can be calculated by using an appropriate, and typically simplified, mathematical model of the combustion phenomenon. The model can be based on combustion physics and/or experimental measurements of the engine type. In the model calculation of the present example all the available internal combustion engine measurements are used as an input data and the model is implemented at a complexity level selected to enable continuous updating with the real-time flow of measurements. As will be appreciated, the estimation need not be a perfect representation of the engine behaviour, rather it is more appropriate to use a model that provides as linear a response as possible to varying engine conditions. Then the burning quality estimate is used at step S5-5 to calculate any required changes to controlled parameters of the engine. Examples of controlled parameters for an internal combustion engine include fuel injection rate/quantity and air inflow rate. For cyclical operation internal combustion engine other parameters may include valve timing and ignition timing. For a continuous operation internal combustion engine other parameters may include compressor speed and propelling nozzle diameter.

The final step of each loop of the control process is to update at step S5-7 the controlled parameters in accordance with the calculated changes from step S-5.

In an example where inputs other than the temperature flux sensors are taken into account, these other parameters can be taken into account at step S5-5 where changes to the controlled parameters are calculated.

Thus there has now been described an approach for controlling the operation of an internal combustion engine to optimise the combustion performance of the engine based upon measurements of heat flux from sensors provided at the combustion chamber of the engine.

It will be appreciated that in some examples the output of a heat flux sensor may not be suitable for being fed directly to the engine control unit of an internal combustion engine. The output levels may be incompatible with the input channels for the engine control unit and/or the engine control unit may not have the capability to calculate useful control parameters from the raw sensor output. For such a scenario, additional modules may be provided between the sensors and the engine control unit. To deal with signal levels too small for the engine control unit, an amplifier may be used to boost the sensor output to a usable signal level. For a situation where the engine control unit has no capability to process the sensor readings into a usable control parameter (such as the estimate of burning quality discussed with reference to step S5-5 above), there can be provided a signal processor module to process the sensor outputs to produce the usable parameters for the engine control unit. The usable parameters may be a burning quality estimate such as an estimate of fuel burning rate, an estimate of completeness of combustion or the like. The output from such a signal processor could be an analog or digital value or set of values for use as an input by the engine control unit. Such an amplifier and/or signal processor could be integral with the engine control unit or provided as one or more addition modules external to the engine control unit.

Therefore, in accordance with some examples, there can be provided an engine control apparatus having a controller operable to receive input from a heat flux sensor arranged to measure combustion power within an internal combustion engine and to use said input in a control process to determine an adjustment to a controllable engine operation parameter.

Further examples consistent with the present teachings are set out in the following numbered clauses:

Clause 1 An engine control apparatus, comprising: a controller operable to receive input from a heat flux sensor arranged to measure combustion power within an internal combustion engine and to use said input in a control process to determine an adjustment to a controllable engine operation parameter.

Clause 2 The apparatus of clause 1, wherein the controllable engine operation parameter comprises one or more selected from the group comprising: fuel supply quantity; oxidant supply quantity; ignition timing; oxidant supply timing; fuel supply timing; exhaust outlet timing; exhaust outlet quantity; and valve timing.

Clause 3 The apparatus of clause 1 or 2, wherein the internal combustion engine comprises a continuous combustion engine or a cyclical combustion engine.

Clause 4 The apparatus of clause 1, 2 or 3, further comprising the heat flux sensor, the heat flux sensor being arranged in direct thermal communication with a combustion chamber of the engine.

Clause 5 The apparatus of any preceding clause, further comprising an amplifier arranged between the controller and a heat flux sensor to amplify the input from the heat flux sensor.

Clause 6 The apparatus of any preceding clause, further comprising a signal processor connected to receive the input from a heat flux sensor and configured to calculate therefrom a parameter indicative of combustion quality and to provide the parameter as an input to the controller.

Clause 7 The apparatus of clause 5 or 6, wherein the controller comprises the amplifier and/or the signal processor.

Clause 8 The apparatus of any preceding clause, wherein the controller is operable to receive input from a plurality of heat flux sensors.

Clause 9 A combustion system comprising: an internal combustion engine having a combustion chamber; a heat flux sensor provided at the combustion chamber; and an engine controller arranged to receive a signal from the heat flux sensor and to control a controllable engine operation parameter in dependence upon said signal.

Clause 10 The system of clause 9, wherein the controllable engine operation parameter comprises one or more selected from the group comprising: fuel supply quantity; oxidant supply quantity; ignition timing; oxidant supply timing; fuel supply timing; exhaust outlet timing; exhaust outlet quantity; and valve timing.

Clause 11 The system of clause 9 or 10, wherein the internal combustion engine is a cyclical combustion engine comprising a plurality of combustion chambers, and wherein at least one combustion chamber has a heat flux sensor.

Clause 12 The system of clause 9, 10 or 11, wherein the engine controller is configured to use a parameter derived from the signal and indicative of combustion quality to determine whether to adjust a controllable engine operation parameter.

Clause 13 The system of any of clauses 9 to 12, wherein the heat flux sensor is a heterogeneous gradient heat flux sensor.

Clause 14 The system of any of clauses 9 to 13, comprising a plurality of heat flux sensors provided at the combustion chamber.

Clause 15 A sensor kit for installation to an internal combustion engine, the kit comprising: at least one heat flux sensor installable to a combustion chamber of an internal combustion engine and operable to output a signal representative of a heat flux at the sensor during a combustion cycle of the internal combustion engine.

Clause 16 The kit of clause 15, further comprising a signal conveyor connectable to convey an output signal from the heat flux sensor to an engine management system for an engine into which the heat flux sensor is to be installed.

Clause 17 The kit of clause 15 or 16, wherein the signal conveyor comprises an amplifier configured to amplify a signal from the heat flux sensor for use by an engine management system.

Clause 18 The kit of clause 15, 16 or 17, wherein the signal conveyor comprises a signal processor configured to calculate from the output signal from the heat flux sensor a thermal power value and to output the thermal power value from the signal conveyor.

Clause 19 The kit of any of clauses 15 to 18, wherein the heat flux sensor comprises a heterogeneous gradient heat flux sensor.

Clause 20 A method of controlling an internal combustion engine, the method comprising: receiving a signal from a heat flux sensor of a combustion chamber of the internal combustion engine; and using the signal as an input to a feedback control loop for controlling one or more controllable engine operation parameters of the internal combustion engine.

Clause 21 The method of clause 20, further comprising generating from the signal from a heat flux sensor a thermal power value representative of thermal power generated by combustion in the internal combustion engine.

Clause 22 The method of clause 20 or 21, wherein the method is a feedback control method.

While the present teachings are described herein by way of example for several embodiments and illustrative drawings, those skilled in the art will recognize that the present teachings are is not limited to the embodiments or drawings described. It should be understood, that the drawings and detailed description thereto are not intended to limit the scope to the particular form disclosed. As used throughout this application, the word "may" is used in a permissive sense (i.e. meaning "might") rather than the mandatory sense (i.e., meaning "must"). Similarly, the words "include", "including", and "includes" mean including, but not limited to.

The invention claimed is:

1. An engine control apparatus, comprising:
  a controller connected to receive input from a heterogeneous gradient heat flux sensor, the heterogeneous gradient heat flux sensor arranged to measure combustion power within an internal combustion engine, the controller configured to use said input in a control process to determine an adjustment to a controllable engine operation parameter; and
  the engine control apparatus further comprising the heterogeneous gradient heat flux sensor, the heterogeneous gradient heat flux sensor comprising metal-metal or metal-semiconductor layers with the layers being inclined relative to the operating surface of the sensor and wherein heat and electric conductivity and thermoelectric power coefficient are different in two dimensions, and being arranged with the operating surface in direct thermal communication with a combustion chamber of the engine.

2. The apparatus of claim 1, wherein the controllable engine operation parameter comprises one or more selected from the group comprising: fuel supply quantity; oxidant supply quantity; ignition timing; oxidant supply timing; fuel supply timing; exhaust outlet timing; exhaust outlet quantity; and valve timing.

3. The apparatus of claim 1, wherein the internal combustion engine comprises a continuous combustion engine or a cyclical combustion engine.

4. The apparatus of claim 1, further comprising an amplifier connected between the controller and a heat flux sensor to amplify the input from the heat flux sensor.

5. The apparatus of claim 4, wherein the controller comprises the amplifier.

6. The apparatus of claim 1, further comprising a signal processor connected to receive the input from a heat flux sensor and configured to calculate therefrom a parameter indicative of combustion quality and connected to provide the parameter as an input to the controller.

7. The apparatus of claim 6, wherein the controller comprises the signal processor.

8. The apparatus of claim 1, wherein the controller is operable to receive input from a plurality of heat flux sensors.

9. An combustion system comprising:
  an internal combustion engine having a combustion chamber;
  a heterogeneous gradient heat flux sensor comprising metal-metal or metal-semiconductor layers with the layers being inclined relative to the operating surface of the sensor and wherein heat and electric conductivity and thermoelectric power coefficient are different in two dimensions, and arranged with the operating surface in direct thermal communication with the combustion chamber; and an engine controller arranged to receive a signal from the heterogeneous gradient heat flux sensor and to control a controllable engine operation parameter in dependence upon said signal.

10. The system of claim 9, wherein the controllable engine operation parameter comprises one or more selected from the group comprising: fuel supply quantity; oxidant supply quantity; ignition timing; oxidant supply timing; fuel supply timing; exhaust outlet timing; exhaust outlet quantity; and valve timing.

11. The system of claim 9, wherein the internal combustion engine is a cyclical combustion engine comprising a plurality of combustion chambers, and wherein at least one combustion chamber has a heat flux sensor.

12. The system of claim 9, wherein the engine controller is configured to use a parameter derived from the signal and indicative of combustion quality to determine whether to adjust a controllable engine operation parameter.

13. The system of claim 9, comprising a plurality of heat flux sensors provided at the combustion chamber.

14. A sensor kit for installation to an internal combustion engine, the kit comprising:

at least one heterogeneous gradient heat flux sensor comprising metal-metal or metal-semiconductor layers with the layers being inclined relative to the operating surface of the sensor and wherein heat and electric conductivity and thermoelectric power coefficient are different in two dimensions, and installable to have the operating surface thereof in direct thermal communication with a combustion chamber of an internal combustion engine, and operable to output a signal representative of a heat flux at the sensor during a combustion cycle of the internal combustion engine; and a signal conveyor connectable to convey an output signal from the heat flux sensor to an engine management system for an engine into which the heat flux sensor is to be installed.

15. The kit of claim 14, wherein the signal conveyor comprises an amplifier configured to amplify a signal from the heat flux sensor for use by an engine management system.

16. The kit of claim 14, wherein the signal conveyor comprises a signal processor configured to calculate from the output signal from the heat flux sensor a thermal power value and to output the thermal power value from the signal conveyor.

17. A method of controlling an internal combustion engine, the method comprising:

receiving a signal from a heterogeneous gradient heat flux sensor of a combustion chamber of the internal combustion engine, wherein the heterogeneous gradient heat flux sensor comprises metal-metal or metal-semiconductor layers with the layers being inclined relative to the operating surface of the sensor and wherein heat and electric conductivity and thermoelectric power coefficient are different in two dimensions, and is arranged with the operating surface in direct thermal communication with a combustion chamber of the engine; and using the signal as an input to a feedback control loop for controlling one or more controllable engine operation parameters of the internal combustion engine.

18. The method of claim 17, further comprising generating from the signal from a heat flux sensor a thermal power value representative of thermal power generated by combustion in the internal combustion engine.

19. The method of claim 17, wherein the method is a feedback control method.

* * * * *